Feb. 8, 1966  H. A. MERGES  3,233,836
DEVICE FOR SEPARATION OF RUBBER AND TEXTILE FIBERS
FROM THEIR BONDED MIXTURE
Filed Dec. 4, 1961  2 Sheets-Sheet 1
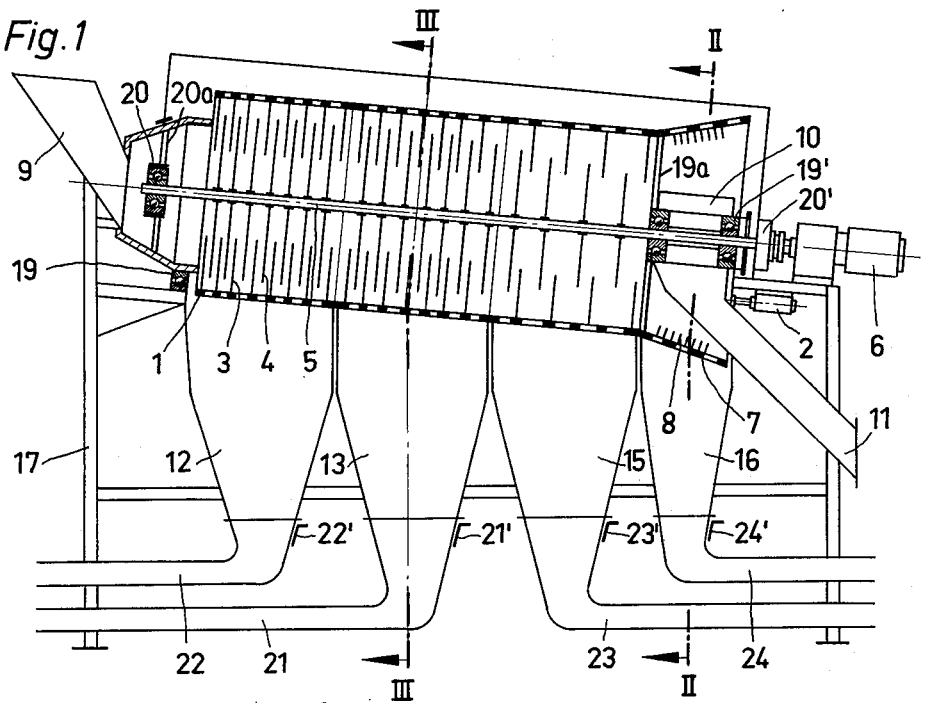
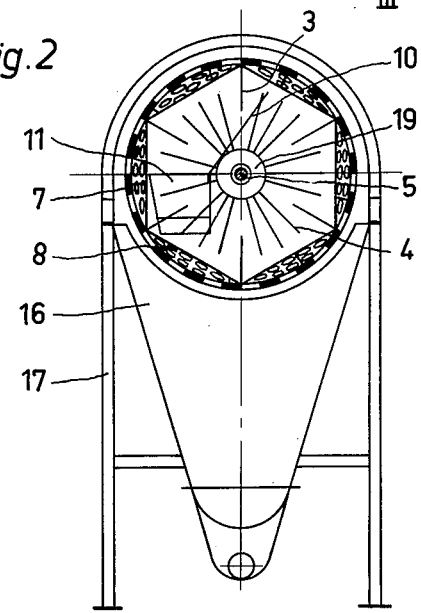
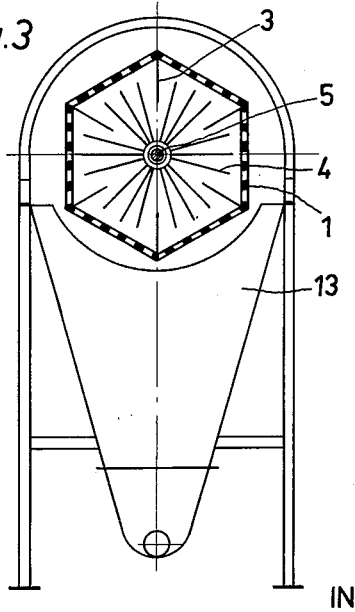
INVENTOR
HERBERT ALFRED MERGES
By Kurt Kelman
agent Feb. 8, 1966  H. A. MERGES  3,233,836
DEVICE FOR SEPARATION OF RUBBER AND TEXTILE FIBERS
FROM THEIR BONDED MIXTURE
Filed Dec. 4, 1961  2 Sheets-Sheet 2

INVENTOR

HERBERT ALFRED MERGES
By Kurt Kelman
  agent 3,233,836
DEVICE FOR SEPARATION OF RUBBER AND TEXTILE FIBERS FROM THEIR BONDED MIXTURE
Herbert Alfred Merges, Werkstr. 1,
Wolfgang, near Hanau, Germany
Filed Dec. 4, 1961, Ser. No. 156,785
Claims priority, application Germany, Dec. 10, 1960,
C 22,939
10 Claims. (Cl. 241—73)

This invention relates to machines employed in the crushing and separation of rubber and textile compounds, especially of unserviceable or rejected motor-car tires. More specifically, the invention relates to a device for processing pre-crushed mixtures of rubber and textile fibers so as to divide the cord-reinforced rubber fragments into their components, and to sort the fibers by size.

The problem of separating the two components has so far presented difficulties that have precluded satisfactory results by conventional means, namely, a separation of rubber and textile fibers from their bulk in a continuous mechanical process at reasonable cost for the industry involved. These difficulties stem not only from the rubber and textile fibers themselves that are so different in nature, but also from the fact that manufacturers of tires employ fabrics of rayon, perlon, nylon, or a mixture thereof in such a way that the individual fibres of the fabric are rubber-coated to provide a firm bond to the rubber forming the tread of the tire. Even after thorough crushing, the fragments of rubber-bonded fibers cannot be separated from the surrounding rubber by known procedure, for instance, by air blowing. On the other hand, proper separation would help to recover relatively large quantities of raw materials from waste, rejects, or unserviceable compounds. It is therefore a major object of the present invention to provide means by which fragments of rubber and fabric fibers, pre-crushed by conventional machines as rubber crushers and studded-disc mills and severed from each other as far as has been possible to this day, are separated into rubber particles and fabric fibers.

Another object of this invention is to arrange the said means so as to separate the two components of rubber and fabric in a sequential operation permitting simultaneous sizing of particles.

A further object of the invention is to distribute the said means in a device in such a way that the rubber particles are divided by grain sizes when discharged by the device.

Still another object of the present invention is to provide the said device equipped for continuous operation without interruption.

Finally it is an object of this invention to separate rubber from fabric components to such a degree that each of the separated components is ready to be used as raw material in any production-process application and that the possible presence of remnants of the other component does not preclude such use.

It is believed that these objects are attained by a number of characteristic features that may be combined in a number of different embodiments described hereinafter.

One of these features is the interworking of a drum, equipped with spikes or rods extending from the drum inside in radial direction towards the drum centerline, with an independently rotating shaft provided in the drum centerline or else in a position eccentrically related to the drum centerline, and likewise equipped with spikes or rods extending from the shaft in radial direction, the drum and the shaft rotating at speeds and in sense independent of each other so that the shaft rods partly pass through the spaces between the drum rods.

Another feature of this invention is the distribution of the drum and shaft rods in interdependence with their relative lengths. While the drum rods are, viewed in axial direction of the drum, differently spaced, the shaft rods form a helix around the shaft and immerse, during the relative rotation of drum and shaft, into the spaces between the drum rods, the depths of immersion being different in different sections of the drum and shaft assembly in longitudinal or axial direction.

Among these features of the invention is also the flared discharge end of the rotary drum which is equipped, on its inside, with sets of comb-like teeth interworking with a baffle and a discharge chute.

Further features, especially the provision of a cranked shaft, of bend rods, and of rods made resilient to enhance their beating effect, will become apparent by the now following description of the general mode of operation of the device constituting the present invention.

This mode of operation may be summarized by the statement that the drum and the shaft rotate either in opposing senses or in the same sense, but at different speeds of rotation so that the combing and beating effects of their respective rods succeed in separating the components of a mixture. Since the drum has the additional function of a sizing drum, the rubber particles are in this operation assorted by size and discharged through various chutes along the drum while the textile fibers are discharged by a chute at the end of the drum.

During this operation, the particles of the two components are separated at the same time when the rest of the mixture is conveyed in forward direction towards the drum discharge end. This is brought about by the density of the rod spacing close to the charging end of the drum where the beating effect of the rods causes the fiber lumps with the rubber enclosed to be loosened. In the adjacent section of the drum, the rubber particles may drop through the bulk of the mixture processed which, at this stage, may be likened to a network having ever wider becoming meshes; this process is aided by the drum rotation causing the bulk of material to follow this rotary motion, to be lifted, and to drop towards the shaft rods in a process repeated again and again. Here the beating effect, although rather lessened, causes the bulk material to disintegrate more and more while the rubber particles constantly drop from this bulk between the rods towards the inner surface of the sizing drum and from here through matching-size meshes of the drum into the discharging chutes arranged along the drum. This sizing of the rubber particles takes place predominantly in the middle and the last sections of the drum where the rods are less closely spaced while the rubber dust and the finest particles are discharged in the first drum section where the rubber is separated from the fabric fibers by the beating rods. Both the drum rods and the shaft rods need not extend radially, but may also be inclined against the respective radius, preferably in a sense opposite to the direction of their rotation.

The beating efficiency of the rods on the shaft can be increased when these rods are made resilient so that they can be bent back by the bulk material when they interlace with the rods of the drum and then beat with enhanced force in the course of the shaft revolution. This resiliency need not be left to chance and can be predetermined by stops provided on the drum inner surface so that the shaft rods are pretensioned by these stops, depending on the length of the latter, and can then, when released, beat the bulk material with greater force.

It corresponds to the true sense of the invention that the shaft is provided inside the sizing drum; but, apart from its central position coinciding with the drum centerline, the shaft may be either cranked or left straight, but positioned eccentrically. In both of the latter-mentioned cases, the drum will enclose spaces or regions where the rods do not interlace at all or do so to a limited degree. These regions are preferably provided in locations where the bulk material is lifted by the drum rotation and drops down again. In the case of a cranked shaft, this region would rotate within the sizing drum. In both cases there would also be regions where the shaft rods immerse to a greater depth between the drum rods, reaching almost to the drum inner surface where the rods are of maximum length; as a result, fibers located between the drum rods are combed out and lifted by the shaft rods.

Details of the above generally described mode of operation of the device constituting the present invention will now be divulged in connection with some particular embodiments thereof. From the above it will be understood that various modifications may be made in such embodiments, and it is intended to cover in the appended claims all such modifications corresponding to the scope of this invention.

Reference is made to the following specification of the invention and to the drawings attached wherein like numerical designations refer to the same parts throughout, and in which:

FIG. 1 is a sectional view of the device wherein the shaft is centrally located within the drum;

FIG. 2 is a cross-sectional view of the device taken substantially on the plane indicated by the line II—II in FIG. 1;

FIG. 3 is a cross-sectional view of the device taken substantially on the plane indicated by line III—III in FIG. 1;

Figure 4:
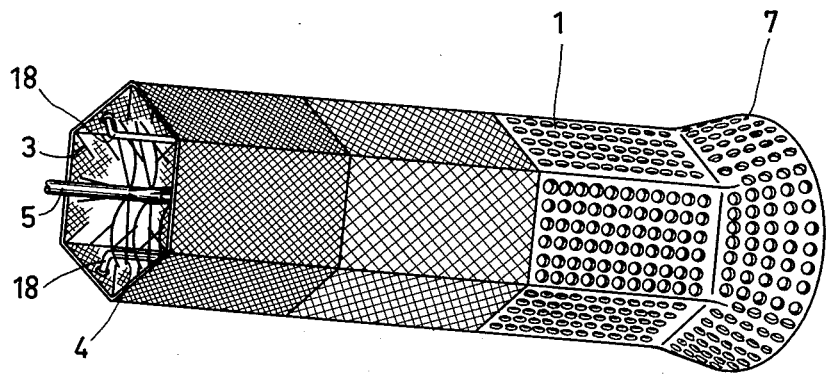
FIG. 4 is a perspective drawing of the detail showing the sizing drum with the sizing mesh sieve partly cut away.

In FIG. 1, there is shown a drum 1 which rotates on bearings 19, 19′ and is driven by a motor 2. The bearing 19 is supported on the stand or frame 17 of the apparatus. The bearing 19′ is supported on a shaft 5 which is rotated in its bearings 20, 20′ by a motor 6. The bearing 20′ is mounted on a stand 17. The bearings 19′ and 20 are connected with the drum 1 by spokes 19a, 20a respectively. The common axis of the drum 1 and the shaft 5 is arranged in an obliquely inclined position in the supporting stand 17 so that the charging or input chute 9 for the drum 1 is located at a higher point, referred to the horizontal, then the discharging chute of the same drum. The sloping wall of the sizing drum sieve meshes that are small at the charging end and gradually increases in size towards the discharging end of the drum 1 and permitting rubber particles, assorted by particle or grain sizes, to be discharged through the chutes 12, 13, 15 and 16. That section of the drum 1 equipped with radially directed rods 3 has preferably a hexagonal cross-section as indicated in FIG. 3. The rods 3 inside the sizing drum 1 are preferably arranged in rows along the corners of the hexagon, the spacing between the rods of a row becoming larger in the direction from the charging to the discharging end of the drum, in accordance with the mesh size increasing in the same direction. Moreover, the length of the drum rods 3 becomes less and less, starting about at the first drum half so that the shortest rods 3 appear in the second half of the drum 1. These drum rods may extend radially towards the drum centerline, but they may also be inclined in a direction across the drum 1.

Another set of rods 4 is provided on the shaft 5 driven by the mortor 6. These rods 4 are arranged along a helical line around the shaft 5 to assist in conveying the fibers processed through the length of the drum 1. The rods 4 extend radially from the shaft 5 and are uniformly spaced along a line forming a helix around the shaft 5 and thus differ in the mode of spacing from the drum rods 3. The length of the shaft rods 4 is so dimensioned that they interlace with the drum rods 3 at least in those drum sections closest to the charging or input section of the drum; however, this length gradually decreases in the direction towards the discharging or output section of drum 1 until the rods 4 are so short that their ends, during rotation or the shaft 5, may be said to form a circle of the same diameter as the circle formed by the free ends of the drum rods 3 during rotation.

The last section or output section 7 of drum 1 flares and has the shape of a truncated cone or pyramid. In the case of a truncated pyramid, its cross-sectional view forms just the same polygon as the drum 1 as shown in FIG. 3. The inside of the discharge section of drum 1 bears teeth 8 (FIG. 1) arranged in axial rows having equidistant spacings along the circumference of the drum. These teeth 8 rotate with the drum 1 and, in their upward motion, lift the fabric fibers that are almost totally free of rubber particles, dropping these fibers in the region of the baffle 10 so that they are deflected by this baffle to the discharging chute 11.

Residual rubber particles can be separated from the fibers even in this drum section and may drop through the relatively wide meshes of the drum to the floor either directly or through the last rubber chute 16.

In the simplified perspective drawing of the sizing drum 1 shown in FIG. 4 wherein a part of the drum is cut away, the stops 18 hold up the resiliently flexible rods 4 of the shaft 5, bending them back from their normal positions in each revolution and releasing them for return toward the normal positions in the next portion of the revolution under their own resilience, thus pre-tensioning the rods 4 to increase their beating force in a continuous process provided by the constant relative rotation of the drum 1 and the shaft 5.

Figure 5:
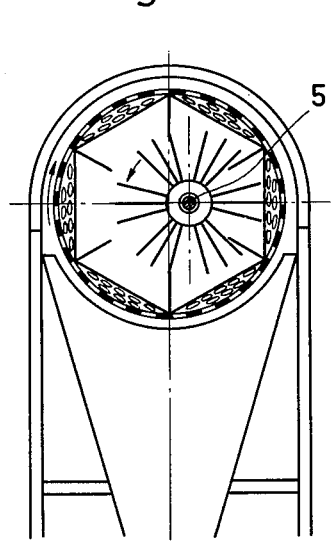
FIG. 5 is a cross-sectional view as in FIG. 2 of a device wherein the shaft is eccentrically located in the drum.
Figure 6:
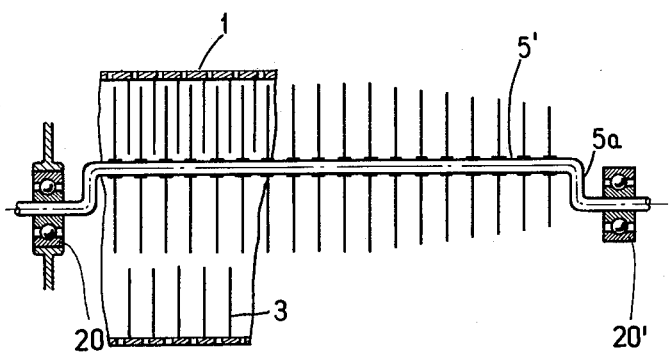
FIG. 6 is the sectional view of a cranked shaft with its bearings and portions of a cooperating drum.

FIG. 5 illustrates the cross-sectional relation of the drum 1 to the shaft 5 when the latter is arranged not in a line coinciding with the drum centerline, but in a line radially spaced from the drum axis. FIG. 6 is an illustration of another embodiment where the shaft 5′ is rotatable about the drum axis on short crank arms 5a so that the cranked shaft section may perform a motion around the centerline of the shaft bearings 20, 20′. During rotation of the shaft, the free ends of the drum rods 3 in the first or charging section of the drum 1 partly shown in FIG. 6 nearly touch the eccentric shaft portion.

Referring once more to FIG. 1, the rubber fractions discharged through the chutes 12, 13, 15, 16 are carried away through the conveying tubes 21, 22, 23, 24 preferably by pneumatic means that are so devised as not to impede, by the force of suction, the sizing and sorting action of the drum 1. For instance, the suction air can be prevented from attracting fabric fibers against the drum inside by the shutters 21′ through 24′ controlling the amount of ambient air passing through the suction line. The exhaustors required for this operation are not shown in FIG. 1.

What is claimed is:

1. An apparatus for separating rubber particles from reinforcing fibers of waste tire material and the like comprising, in combination:
    (a) a drum member having an axis and a wall about said axis, said wall being perforated to constitute a sieve, respective portions of said wall constituting an input section of said drum and an output section thereof axially spaced from said input section;
    (b) a plurality of first rods mounted on said wall in axially and circumferentially spaced relationship and extending therefrom toward said axis, the axial spacing of said rods being substantially smaller than the length thereof;
    (c) a shaft member axially elongated in said drum;
    (d) actuating means for actuating rotary movement of said members relative to each other about said axis; and
    (e) a plurality of second rods mounted on said shaft member, said second rods being elongated in a normally radial direction from said shaft member toward said wall, said second rods being arranged about said shaft along a helical line for interlacing engagement with respective axially spaced pairs of said first rods during said relative rotary movement of said members.

2. An apparatus as set forth in claim 1, wherein said output section axially flares in a direction away from said input section, the apparatus further comprising a plurality of teeth arranged on said output section and facing said axis, said teeth being arranged in a plurality of axially elongated circumferentially spaced rows for lifting fibers and dropping the same during said rotary movement, and chute means for receiving the dropped fibers.

3. An apparatus as set forth in claim 1, further comprising a support, said drum member being mounted on said support for rotation about said axis, said axis being obliquely inclined with respect to a horizontal direction in such a manner that said wall slopes downward from said input section toward said discharge section.

4. An apparatus as set forth in claim 1, wherein said second rods are resiliently flexible, and further comprising stop means on said wall engageable with said flexible rods during said rotary movement for bending the same from their normal positions during a portion of a revolution of said movement, and for releasing them for return toward said normal position under their own resilience.

5. An apparatus as set forth in claim 1, wherein said shaft member is radially spaced from said axis.

6. An apparatus as set forth in claim 1, further comprising crank means rotatable about said axis, said shaft member being mounted on said crank means in a position radially spaced from said axis.

7. An apparatus as set forth in claim 6, wherein said first rods in said input section extend to a location closely adjacent said shaft member during a portion of each revolution of said rotary movement.

8. An apparatus as set forth in claim 1, wherein the perforations of said sieve increase in size from said input section toward said output section, said apparatus further comprising a plurality of chute means arranged adjacent respective portions of said sieve having perforations of different size for separately receiving particles passing through said perforations.

9. An apparatus as set forth in claim 8, further comprising a plurality of pneumatic conveying means respectively communicating with said chute means for conveying said particles by suction, and shutter means in each of said conveying means for controlling the suction exerted on said perforations.

10. An apparatus as set forth in claim 1, wherein the spacing of said first rods increases in a direction from said input section toward said output section, the length of said second rods decreases along said helical line in said direction, said wall being substantially conical in said output section, the apparatus further comprising a plurality of teeth arranged on said output section and facing said axis, said teeth being arranged in a plurality of axially elongated circumferentially spaced rows for lifting fibers and dropping the same during said rotary movement, and chute means for receiving the dropped fibers.

References Cited by the Examiner
UNITED STATES PATENTS

| 267,501 | 11/1882 | Davis | 19—90 |
|---|---|---|---|
| 454,525 | 6/1891 | Pickles | 19—90 |
| 482,669 | 9/1892 | Young | 19—90 |
| 1,250,554 | 12/1917 | Bryan | 209—297 |
| 1,778,088 | 10/1930 | Pate | 209—257 |
| 2,047,202 | 7/1936 | Hardinge | 209—452 |
| 2,592,481 | 4/1952 | Spencer | 241—102 |
| 2,922,450 | 1/1960 | Barbee | 241—190 X |
| 3,021,008 | 2/1962 | Christian | 209—299 |

HARY B. THORNTON, *Primary Examiner.*

FRANK W. LUTTER, RICHARD A. O'LEARY,
*Examiners.*